A. F. & C. H. NORRIS.
PEDAL LEVER SPRING.
APPLICATION FILED FEB. 24, 1913.
1,117,892.
Patented Nov. 17, 1914.
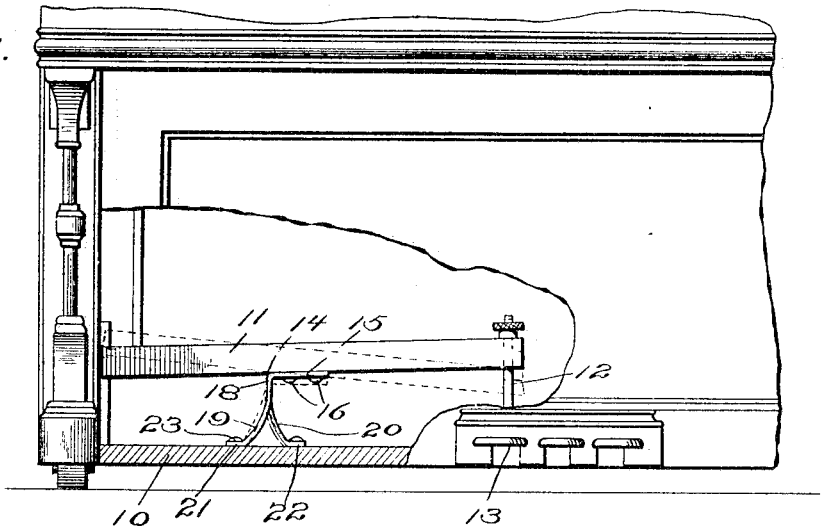
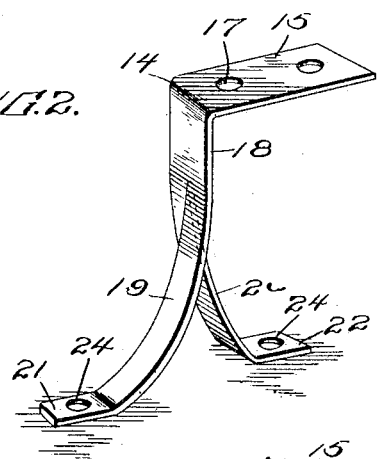
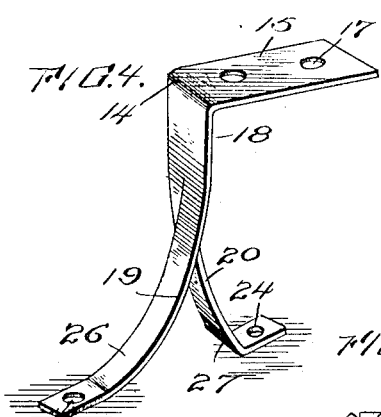
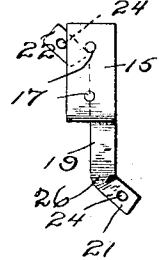
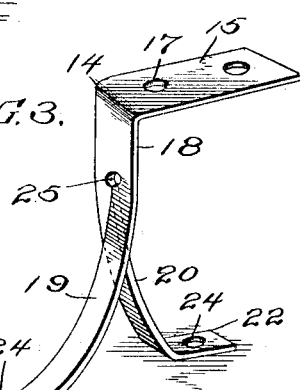
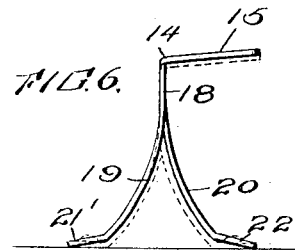
Inventors
Albert F. Norris and
Clifton H. Norris,
Witnesses

UNITED STATES PATENT OFFICE.

ALBERT F. NORRIS AND CLIFTON H. NORRIS, OF STOUGHTON, MASSACHUSETTS.

PEDAL-LEVER SPRING.

1,117,892.  Specification of Letters Patent.  Patented Nov. 17, 1914.

Application filed February 24, 1913. Serial No. 750,348.

*To all whom it may concern:*

Be it known that we, ALBERT F. NORRIS and CLIFTON H. NORRIS, citizens of the United States, residing at Stoughton, in the county of Norfolk and State of Massachusetts, have invented certain new and useful Improvements in Pedal-Lever Springs; and we do hereby declare the following to be a full, clear, and exact description of the invention, such as will enable others skilled in the art to which it appertains to make and use the same.

This invention relates to pedal lever springs for pianos and has for an object to provide a spring embodying new and improved features of utility, economy, reliability and efficiency.

A further object of the invention is to provide a spring for piano pedal levers which takes the place of the block ordinarily employed for such purposes and at the same time provides a spring which does not move the lever longitudinally to an undesirable extent.

A further object of the invention is to provide a pedal lever spring composed of a single strip of spring material of equal cross area throughout its length, a portion of which is slitted to form spaced supporting feet.

A further object of the invention is to provide a spring embodying a portion normally substantially horizontal with a downwardly extending portion slitted to form oppositely curved supporting brackets which are oppositely affected during the manipulation of the lever to reduce the concavity of one curved leg and increase the concavity of the other leg.

A further object of the invention is to provide in a spring as above described improved means for exerting tension on the screws by which the bracket is secured to the base board.

A further object of the invention is to provide a spring having its supporting legs turned or curved outwardly beyond the lines of the body and the lever to permit ready access to such screws with a screw driver or other implement.

A further object of the invention is to provide in a slitted spring a hole positioned at the termination of the slit whereby a definite termination of such slit is provided.

With these and other objects in view the invention comprises certain novel construction, combinations and arrangement of parts as will be hereinafter more fully described and claimed.

In the drawings: Figure 1 is a fragmentary view of a conventional piano case, part of the front wall being broken away to show a pedal lever in position supported by the improved spring. Fig. 2 is a perspective view of the simplest embodiment of the improved spring. Fig. 3 is a perspective view of the spring showing a hole formed to provide a termination for the slit. Fig. 4 is a perspective view of the spring with the feet turned outwardly to permit access with a screw driver. Fig. 5 is a top plan view of the spring as shown at Fig. 4 showing the relative curvature of the feet. Fig. 6 is a view in side elevation of a spring having inclined supporting feet adapted to exert tension upon the inserted screws.

Like characters of reference designate corresponding parts throughout the several views.

The improved pedal lever spring which forms the subject matter of this application is adapted for use in pianos especially of the upright type as shown conventionally at 10 in Fig. 1. The spring is mounted directly upon the base board of the case and supports the usual pedal lever 11 connected through the medium of the link 12 with the pedal 13.

The spring comprises a single piece of spring material bent at 14 to provide a substantially horizontal portion 15 which is secured to the under side of the lever 11 in any approved manner as by the screws or bolts 16 inserted through the openings 17. From the portion 15 and substantially at right angles thereto a section 18 depends. such depending portion being slitted as indicated especially in Figs. 2, 3 and 4 forming legs 19 and 20 curved in opposite directions and terminating in feet 21 and 22 respectively, which said feet are the means for attaching to the base board, the attachment being accomplished by screws or bolts 23 inserted through holes 24.

In the process of manufacture it is found desirable to provide a definite limit for the shear cut by which the strip is slit and for that purpose a hole 25 is produced at the upward limit of the slit. It is also desirable under some conditions to curve the lower parts of the legs 19 and 20 outwardly as indicated at 26 and 27 in Figs. 4 and 5 whereby the lever 11 offers no impediment to access with the screw driver for inserting the screws 23. To prevent the spring becoming loosened upon the base board the feet 21′ and 22′ as shown at Fig. 6 are produced not in alinement but with the ends standing normally at an angle to the board and drawn to alinement by the insertion of the screws, the resulting position being shown in dotted lines in Fig. 6.

It will be apparent that while these various improvements have been shown and described in conjunction with different figures of the drawing that all could well and desirably be combined in a single spring, it being assumed for instance that such a spring is shown at both Figs. 1 and 6 having a hole 25 to limit the slit, outwardly curved feet as shown at Figs. 4 and 5, and feet normally out of alinement as shown in operative detail at Fig. 6. While all of the various improvements are capable of combination in a single spring and will under some conditions be so employed it is not necessary under all conditions to employ all of such improvements in a single spring and any of the separate improvements as shown in the separate drawings may be employed singly or in such combinations as circumstances may make desirable. Whatever the form, the resultant spring is as shown at Fig. 1 and the actuation of the lever results in moving the spring as shown in dotted lines in that figure, the radius of curvature of the leg 19 becoming greater and the radius of curvature of the leg 20 becoming less as the pedal is depressed whereby substantially a pivot point is established corresponding to the corner or bend 14 which prevents "travel" or longitudinal movement of the lever 11 to an excessive degree. It has been found that in all springs of simple and economic construction heretofore attempted which are of sufficient height to reach from the base board to the lever undue amount of "travel" is present which has made such springs undesirable. The present spring by reason of the reverse curvature of the legs 19 and 20 and their simultaneous action when the lever is actuated reduces such "travel" to a minimum, while providing a spring of a single piece of material which is, therefore, economical to manufacture, reliable in action and not liable to come apart or otherwise get out of order.

We claim:

1. A piano pedal lever spring comprising a single piece of material of substantially constant area throughout its length, said material being slitted longitudinally for a portion of its length and the bifurcated portions curved reversely to form expanded oppositely concaved legs.

2. A pedal lever spring comprising a single piece of material of substantially constant area throughout its length, said material being slitted longitudinally from one end on a plane parallel with the lesser dimension of the material, forming by such slit two supporting legs curved from each other presenting opposite concavities, and the opposite end of such material bent at substantially right angles to the material at the termination of the slit.

3. A pedal lever spring embodying a strip of material slitted from one end to form legs of substantially equal width which are bent in opposite directions, the extremities of said legs being bent to form feet which are curved outwardly beyond the lines of the strip.

4. A pedal lever spring embodying a strip of material slitted from one end to form legs of substantially equal width curved outwardly from each other and feet formed at the extremities of said legs, said feet being normally inclined to a line touching the extremities of both of said feet.

In testimony whereof we affix our signatures in presence of two witnesses.

ALBERT F. NORRIS.
CLIFTON H. NORRIS.

Witnesses:
 GEO. O. WENTWORTH,
 JENNIE F. MCNAMARA.

Copies of this patent may be obtained for five cents each, by addressing the "Commissioner of Patents, Washington, D. C."